Aug. 6, 1957     H. J. HETRICK     2,801,877
DEVICE FOR USE IN CLEANING FISH
Filed Jan. 6, 1956
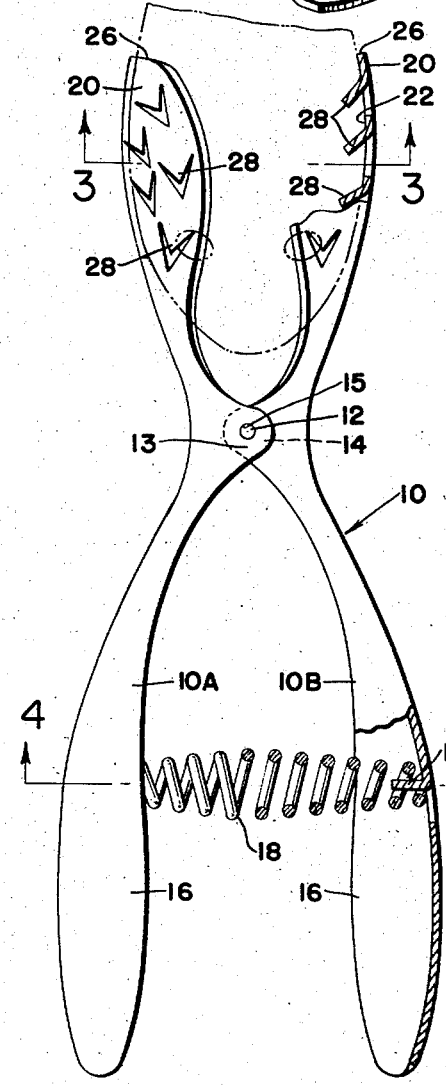
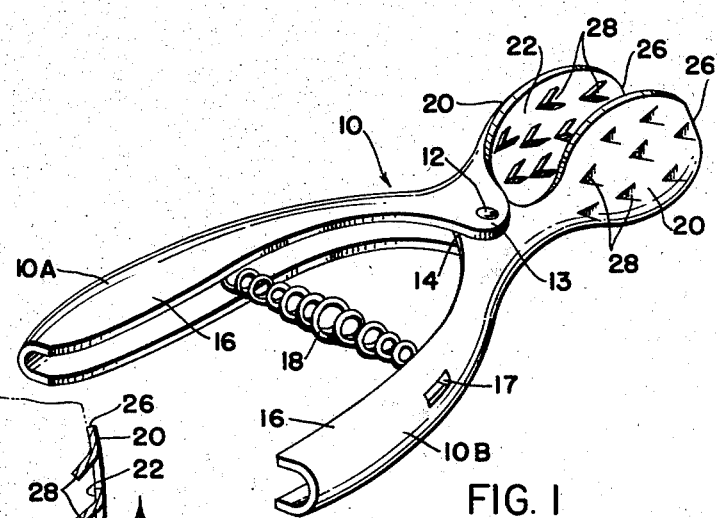
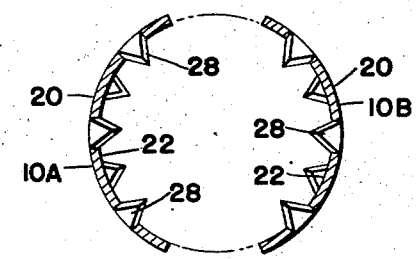
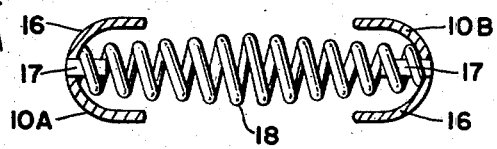
INVENTOR.
HOMER J. HETRICK
BY *Elg. Frye & Hamilton*
ATTORNEYS ়
United States Patent Office 2,801,877
Patented Aug. 6, 1957

---

2,801,877

DEVICE FOR USE IN CLEANING FISH

Homer J. Hetrick, St. Petersburg, Fla.

Application January 6, 1956, Serial No. 557,773

3 Claims. (Cl. 294—106)

The present invention relates to a device for the holding of fish when scaling, scraping and cleaning the same.

It is an object of the present invention to provide an improved device, capable of being grasped in one hand, whereby the head of a fish may be tightly held with the body being exposed to permit scaling, etc.

Another object is to provide a device capable of securely gripping the head of fish of different sizes and shapes and that can be easily manipulated to grip and then release the fish.

A further object is to provide a device having positive means for maintaining a grip on the fish head.

These and other objects of my invention will be apparent in view of the following detailed description taken in connection with the attached drawing.

In the drawing:

Fig. 1 is a perspective view of a fish holding device constructed in accordance with the present invention;

Fig. 2 is a plan view of the device partially broken away with a fish head clamped therein being shown in broken lines;

Fig. 3 is a sectional view taken substantially on line 3—3 of Fig. 2; and,

Fig. 4 is a sectional view taken substantially on line 4—4 of Fig. 2.

Referring to the drawing, a preferred embodiment of my invention is indicated generally by the numeral 10. The device 10 may consist of two lever members 10A and 10B, which are similar to each other except in the area of a pivot or fulcrum pin 12. The member 10A has a pair of flanges 13 which overlay a similar pair of flanges 14 on member 10B. The pivot pin 12, or other suitable fulcrum means, is inserted through a bore 15 in the flanges so as to join the members together.

The handle portions 16 are each provided with suitable means such as the inturned tongues 17 for receiving the ends of a compression spring 18. As shown herein, the spring 18 is always tending to move the handle portions apart. Thus the clamping portions 20, ahead of the pivot pin 12, are always tending to tightly engage the head of a fish placed between these portions. However, if desired, the members 10A and 10B could be made so as to cross each other at the pivot point 12, as in conventional scissors construction, and the compressed spring 18 could be replaced by a tension spring attached to the handles 16 so as to move them together.

The clamping portions 20 each have a transversely concave inner surface 22, slightly rounded inwardly on the longitudinal axis. The outer ends of the clamp portions are rounded in a manner conforming generally with the line of a fish's gills. Thus, the outer curved ends of the clamping portions 20 are somewhat flattened, as shown at 26.

The inner face 22 of each clamp portion is provided with a series of preferably triangular, sharpened projections 28 inclined rearwardly toward the pivot point 12.

The projections 28 will sink deeply in the head portion of the fish so as to grip tightly, without in any manner damaging the edible portions of the fish. For best results, the projections 28 may be staggered randomly over the inner face of the clamp portions though a symmetrical spacing could be provided if desired.

As is apparent from the drawing, the device 10 may be readily clamped upon the head of a fish. Merely gripping the handles 16 tightly will open the clamp portions 20 wide enough to surround the fish head. Release of the handles will cause the projections 28 to grip deeply over the entire head of the fish. The device may be held in one hand while the fisherman's other hand is free to use a scaling or flensing knife. When cleaned and scaled, the fish head may be severed from the edible body portion merely by forcing a knife around the outer end 26 of the clamping portions; which as indicated above, approximates the contour of the fish's gills.

While a preferred embodiment of the invention has been shown it will be apparent that changes and modifications, other than those specifically noted herein, could be made without departing from the basic principles of the invention. Therefore, the annexed claims are intended to embody therein changes of such nature.

What is claimed is:

1. A device for gripping the head of a fish for cleaning, comprising, a pair of opposed lever members engaged at a pivot point and having handles at their inner ends and cooperating clamping portions at their outer ends, resilient means connecting said lever members for urging said clamping portions toward each other, each of said clamping portions having a transversely concave inner surface conforming generally to the shape of the side of a fish's head and a series of substantially triangular sharpened projections inclined inwardly from said surface toward said pivot point for penetrating and gripping the side of a fish's head.

2. A device for gripping the head of a fish for cleaning, comprising, a pair of opposed lever members engaged at a pivot point and having handles at their inner ends and cooperating clamping portions at their outer ends, resilient means connecting said lever members for urging said clamping portions toward each other, each of said clamping portions having a transversely concave inner surface conforming generally to the shape of the side of a fish's head, a series of substantially triangular sharpened projections inclined inwardly from said surface toward said pivot point for penetrating and gripping the side of a fish's head, and an outermost portion rounded in a manner conforming generally with the line of a fish's gills.

3. A device for gripping the head of a fish for cleaning, comprising, a pair of opposed lever members engaged at a pivot point and having handles at their inner end and cooperating clamping portions at their outer ends, resilient means connecting said lever members for urging said clamping portions toward each other, each of said clamping portions having a transversely concave inner surface conforming generally to the shape of the side of a fish's head, the length of each of said inner surfaces between said pivot point and the outer end being such as to position the fish's gills adjacent said outer end when the sides of the fish's head are substantially enclosed therein, a series of substantially triangular sharpened projections inclined inwardly from said surface toward said pivot point for penetrating and gripping the side of a fish's head, and an outermost portion rounded in a manner conforming generally with the line of a fish's gills.

(References on following page)

References Cited in the file of this patent

UNITED STATES PATENTS

| | | |
|---|---|---|
| 1,402,677 | Smith | Jan. 3, 1922 |
| 1,949,452 | Chadwick | Mar. 6, 1934 |
| 1,987,355 | Barnard | Jan. 8, 1935 |
| 2,251,529 | Sterling | Aug. 5, 1941 |
| 2,358,682 | Benton et al. | Sept. 19, 1944 |
| 2,515,292 | Carr | July 18, 1950 |
| 2,561,374 | Igoe | July 24, 1951 |
| 2,634,159 | Agneberg | Apr. 7, 1953 |
| 2,644,455 | Benoit | July 7, 1953 |